UNITED STATES PATENT OFFICE.

JOHANNES J. GROSS, OF HAMBURG, GERMANY.

METHOD OF PRODUCING TANNING COMPOSITIONS FROM WASTE SULFITE-CELLULOSE LIQUOR.

1,154,762.

Specification of Letters Patent. Patented Sept. 28, 1915.

No Drawing. Application filed November 7, 1913. Serial No. 799,678.

*To all whom it may concern:*

Be it known that I, JOHANNES J. GROSS, a subject of the King of Prussia, and resident of Hamburg, Germany, have invented certain new and useful Improvements in Methods of Producing Tanning Compositions from Waste Sulfite-Cellulose Liquor, of which the following is a specification.

This invention relates to an improved method of producing tanning compositions from waste sulfite-cellulose liquor, which is distinguished from the known art by the tanning composition gained having essentially higher contents of efficacious tanning matters. Whereas the proportion of the contents of tanning matters to non-tanning matters is about 1:1 with the known sulfite-cellulose employed as tanning compositions, this proportion is about 2:1 with the improved tanning composition, that is considerably higher. Furthermore the contents of mineral agents in the new product are very low.

According to the invention, the waste sulfite-cellulose liquor is treated in hot condition with hydrochloric acid (HCl) and sulfuric acid ($H_2SO_4$), whereupon the lime still present therein is eliminated by an addition of potassium monochromate ($K_2CrO_4$). The product gained is then concentrated to about 20° Bé., then cooled with an admission of air, and the precipitates then falling are filtered off, whereupon the remaining waste liquor is concentrated to any desired consistency.

It is already known to treat waste sulfite-cellulose liquor with strong mineral acids under heat. The present invention is distinguished therefrom by the simultaneous employment of concentrated hydrochloric acid (HCl) and sulfuric acid ($H_2SO_4$). Thereby, comparatively low contents of non-tanning matters, that is superfluous ingredients in the finished product are obtained, this resulting apparently from the fact that, while the hydrochloric acid decomposes the sulfites ($SO_3Ca$) and oxysulfites of the lime, the simultaneous presence of sulfuric acid ($H_2SO_4$) converts the latter into insoluble sulfate of lime ($CaSO_4$). The latter, now precipitating, causes at the same time organic substances, which have been converted into greasy ingredients by the vigorous action of the hydrochloric acid (HCl), to precipitate. It is further known to add chromium compounds (Cr. salts) to waste sulfite-cellulose liquor for obtaining tannates of chromium, which possess tanning qualities. The method of the present invention works with chromates (Cr≡) in such a way that the finished product contains practically no chromium compounds, but the chromate serves only for precipitating the lime as insoluble calcium chromate ($CrO_4Ca$).

The improved method is put into practice as follows: The waste sulfite-cellulose liquor is in a warm state mixed with pure concentrated hydrochloric acid (HCl) and ordinary sulfuric acid ($H_2SO_4$), while being intimately stirred, and the mixture is boiled for some time. Thereupon, to the hot mixture a small addition of chromate of potassium ($K_2CrO_4$) is made. The mixture thus obtained is allowed to stand for a certain time for precipitation, which can be accelerated by cooling. The clear product gained is then concentrated to about 20° Bé. in a vacuum and then cooled, whereupon air is admitted, whereby precipitation of useless ingredients occurs. Thereupon, the liquor is filtered and the remaining liquor concentrated to any desired consistency.

The end product of 30° Bé. shows the following composition:

Tanning matters, about _____ 32%
Non-tanning matters, about _____ 18%
Water, about _____ 50%

The simultaneous employment of hydrochloric acid (HCl) and sulfuric acid ($H_2SO_4$) under heat has the advantage that hydrochloric acid (HCl) under heat acts in such a way that tanning matters, which can be absorbed by the skin, are formed of the non-tanning matters. Only by this fact, the strikingly high contents of tanning matters, in respect of the sulfite liquors hitherto employed for tanning, can be explained. The sulfuric acid ($H_2SO_4$) precipitates the lime as calcium sulfate ($CaSO_4$), while the still present particles of lime are converted by the addition of potassium chromate ($K_2CrO_4$) into insoluble chromate of lime ($CaCrO_4$), which can be filtered off. A trifling excess of potassium chromate ($Kr_2CrO_4$) would not unfavorably influence the quality of the composition. A further advantage consists in the release of the vacuum and cooling after the concentrating of the liquor to a consistency of about 20°

Bé., whereby the last quantities of sulfate of lime are precipitated. With a concentration in one operation, a thick liquor of about 30° Bé. would be obtained, in which eliminations of calcium sulfate ($CaSO_4$) would either not take place or could not be removed even when considerably cooled. By interrupting, however, the concentration at a lower Bé. degree and cooling, the last quantities of calcium sulfate ($CaSO_4$) can be eliminated and filtered off, whereupon the composition is concentrated to the desired consistency, without running risk of having a product which acts unfavorably on the tanning process.

As a proof of the product having the property stated, it must be mentioned that the product contains 1% of ashes only, while other products, which are on the market and which are designated as good, contain 12 to 15% of mineral agents, so that the new product has an enormous advantage for the practice.

The quantity of hydrochloric acid and sulfuric acid to be added depends on the kind of raw sulfite liquor employed and must be determined by experiments for each particular case. For instance, for a sulfite liquor having contents of lime of 5.5% CaO: 0.5% of concentrated hydrochloric acid (HCl) and 8.0% of concentrated sulfuric acid ($H_2SO_4$) would be taken, while 0.5% of potassium chromate would be added.

I claim:

1. A method of producing tanning compositions from waste sulfite-cellulose liquor, consisting in treating the liquor in a warm state with hydrochloric acid (HCl) and sulfuric acid ($H_2SO_4$), and adding thereto potassium chromate ($Kr_2CrO_4$) thereby eliminating the remaining lime (Ca), substantially as and for the purpose set forth.

2. A method of producing tanning compositions from waste sulfite-cellulose liquor, consisting in treating the liquor in a warm state with hydrochloric acid (HCl) and sulfuric acid ($H_2SO_4$), adding thereto potassium chromate ($Kr_2CrO_4$) thereby eliminating the remaining lime (Ca), concentrating the liquor to about 20° Bé., cooling it with an admission of air, filtering off the precipitate then falling, and concentrating the liquor to any desired consistency, substantially as and for the purpose set forth.

In testimony whereof I have hereunto set my hand in the presence of two subscribing witnesses.

JOHANNES J. GROSS.

Witnesses:
ERNEST H. L. MUMMENHOFF,
IDA CHRIST. HAFERMANN.